June 26, 1951    F. L. ALBEN    2,558,069
FLEXIBLE LATERALLY RESTRAINED CENTER PIN
Filed Sept. 9, 1947    2 Sheets-Sheet 1
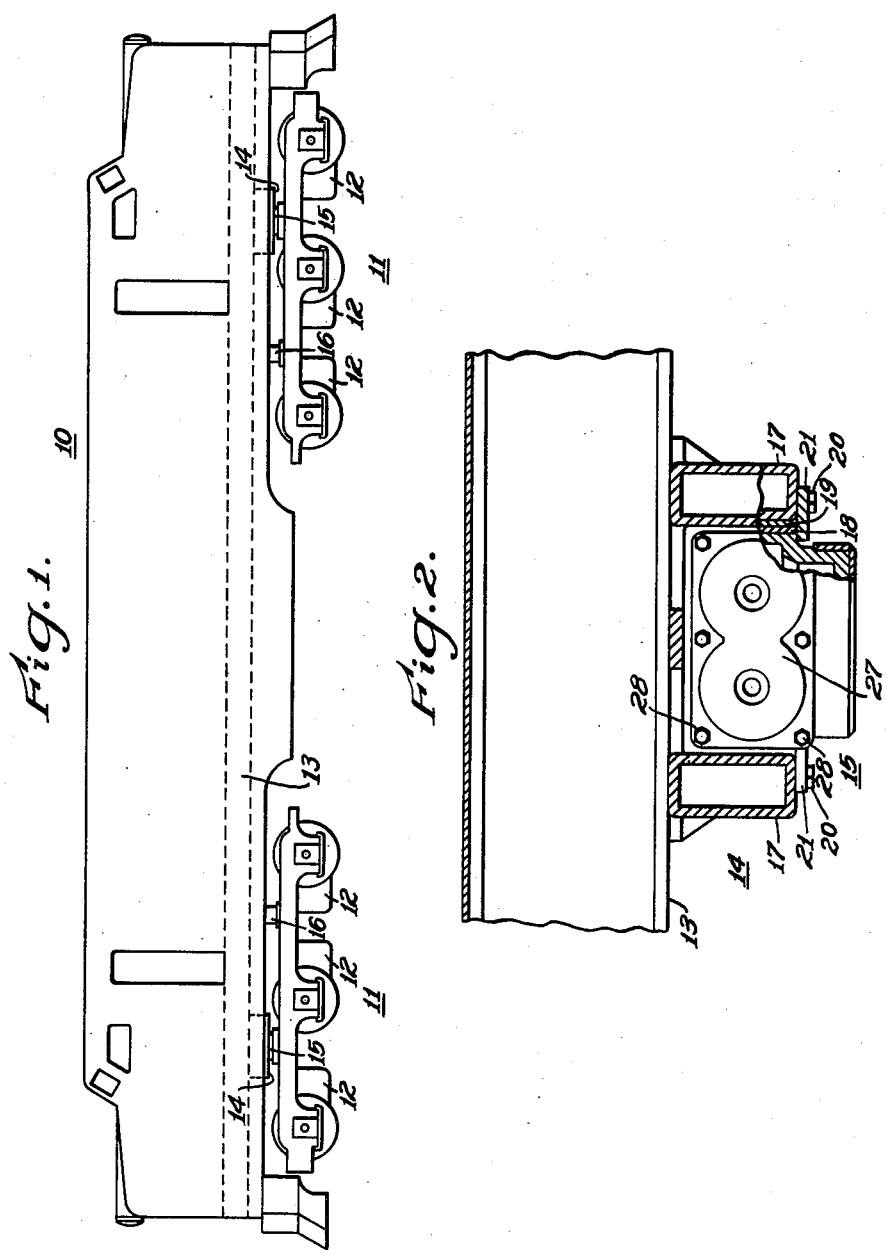
WITNESSES:
Robert C. Baird
Wm. C. Groome
INVENTOR
Frank L. Alben.
BY
G. D. Crawford
ATTORNEY

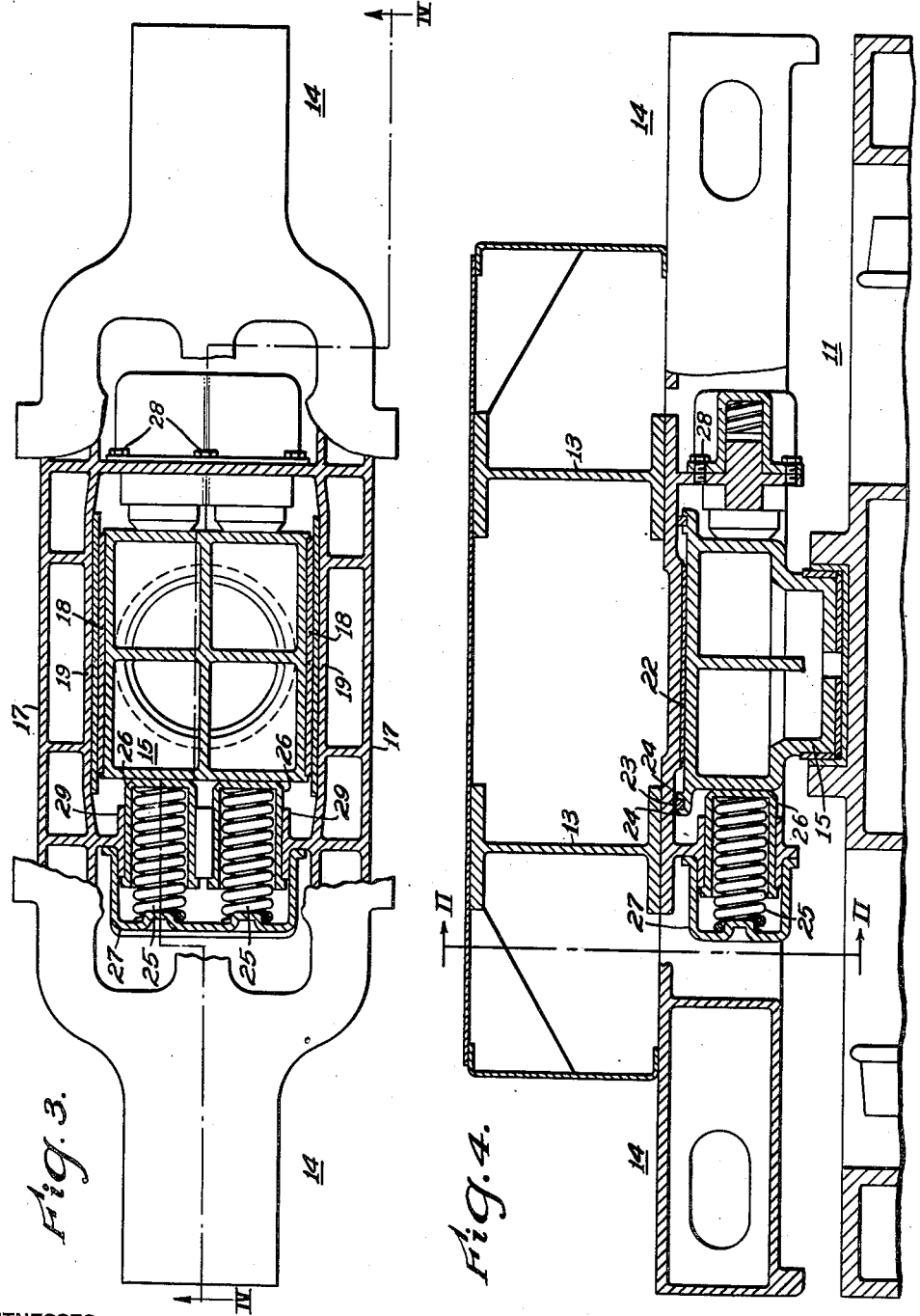

Patented June 26, 1951

2,558,069

UNITED STATES PATENT OFFICE 2,558,069

FLEXIBLE LATERALLY RESTRAINED CENTER PIN

Frank L. Alben, Pittsburgh, Pa., assignor to Westinghouse Electric Corporation, East Pittsburgh, Pa., a corporation of Pennsylvania Application September 9, 1947, Serial No. 773,049

5 Claims. (Cl. 105—199)

My invention relates, generally, to electric locomotives and, more particularly, to center pins for electric locomotives.

The wheel arrangements of electric locomotives designed for high speed operation are such that they provide good tracking characteristics and may consist of articulated trucks with long effective wheel base or they may be of the double truck type with long center spacing and swing bolsters. Locomotives of the articulated type are usually heavy and expensive. Therefore, when it is desired to provide a locomotive of a minimum weight for high speed operation, a locomotive of the double-truck type is usually preferable.

In order to provide the required tractive effort, two six-wheel trucks with three motors in each truck may be utilized. However, when three motors are used in a six-wheel truck, it is extremely difficult to provide swing bolsters in the trucks. Heretofore, swing bolsters have been considered necessary for high speed operation.

An object of my invention is to provide an electric locomotive suitable for high speed operation which does not require swing bolsters on the locomotive trucks.

Another object of my invention is to provide a flexible center pin for a locomotive cab frame.

A further object of my invention is to provide for restraining the lateral movement of a flexible center pin in a locomotive cab frame.

A more general object of my invention is to provide a locomotive of the truck-type which shall be simple and efficient in operation and which may be economically manufactured.

Other objects of my invention will be explained fully hereinafter or will be apparent to those skilled in the art.

In accordance with one embodiment of my invention, a flexible, laterally restrained center pin is built into the underframe of a locomotive cab and provides the equivalent of a swing bolster truck. The restraining action may be obtained by springs or rubber members disposed in cups slidably mounted in the cab underframe.

For a better understanding of the nature and objects of my invention, reference may be had to the following detailed description, taken in conjunction with the accompanying drawings, in which:

Figure 1 is a view, in side elevation, of a locomotive embodying the principal features of my invention;

Fig. 2 is a view, in section, taken along the line II—II of Fig. 4;

Fig. 3 is an enlarged view, in plan, of a locomotive cab cross tie having a laterally restrained center pin built therein, a portion of the structure being broken away for clearness; and Fig. 4 is a view, partially in elevation and partially in section, of the structure shown in Fig. 3 and a portion of one of the locomotive trucks, the section being taken along the line IV—IV in Fig. 3.

Referring to the drawings, and particularly to Fig. 1, the locomotive structure shown therein comprises a cab 10 which is supported by a pair of trucks 11. As shown, each truck is provided with three traction motors 12, there being one motor for each axle of the trucks.

As shown in Figs. 2, 3 and 4, the cab 10 is provided with an underframe comprising I-beams 13 which extend longitudinally of the locomotive cab and rest upon cross ties 14. A center pin 15 is provided in each cross tie 14 for supporting part of the weight of the cab 10. Loading pads 16 are provided to carry part of the weight of the cab and to distribute the weight properly on the trucks 11.

As explained hereinbefore, it is difficult to provide swing bolsters on the trucks of a locomotive when three motors are utilized on a six-wheel truck of the type shown herein. Some of the difficulties encountered are that the motor on the middle axle of a three-axle truck is made inaccessible by the swing bolster and forced ventilation of the motors is difficult to provide because of the swing bolster. Another disadvantage of the swing bolster is that the wheel base of the truck becomes longer because of the swing bolster. Also, the weight and cost of the truck are increased because of the swing bolster.

In order to overcome the foregoing difficulties and disadvantages, I have devised the structure shown herein in which the center pin 15 for each truck is movable laterally in the underframe of the locomotive cab, thereby providing the equivalent of a swing bolster truck. The lateral movement of the center pin is restrained by suitable resilient means such as springs or rubber members which are also mounted in the cross tie of the cab underframe. The laterally movable center pin permits lateral movement of the truck without elevating the cab, thereby providing better riding characteristics than are obtained with a swing bolster truck.

As shown most clearly in Figs. 2, 3 and 4, the rectangular portion of the center pin 15 is slidably disposed between side members 17 of the cross tie 14. Wearing plates 18 and 19 may be provided on the center pin 15 and the side members 17 respectively, to prevent wear on the center pin and the cross tie frame members.

As shown in Fig. 2 the center pin 15 may be retained in position by plates 21 which are attached by bolts 20 to the bottoms of the side members 17 of the cross tie 14. A wearing plate 22 may be provided on the portion of the cross tie 14 which rests on the top of the center pin 15. Lubricating oil or grease may be provided on top of the center pin and retained thereon by a sealing member 23 disposed between flanges 24 on the outer edge of the center pin.

In order to restrain the lateral movement of the center pin 15, helical springs 25 are disposed in cup members 26 which are slidably disposed in the cross tie 14 on opposite sides of the center pin 15. As shown, two springs 25 are provided on each side of the center pin 15. It will be understood that the number of springs utilized may be varied in different structures.

Furthermore, it will be understood that resilient members composed of rubber or a similar material may be utilized in place of the helical springs 25. The springs 25 are retained in the cup members 26 by retaining caps 27 which may be bolted to the cross tie 14 by bolts 28, as shown in Fig. 2. The caps 27 may be readily removed for inspection of the springs 25 and the cups 26.

Referring to Figs. 3 and 4, it will be seen that the lateral movement of the center pin 15 is limited by the center pin striking the portions 29 of the cross tie 14 which support the cups 26. Thus, a predetermined amount of lateral movement of the center pin is provided and the restraining action is determined by the strength and initial compression of the springs 25.

From the foregoing description it is apparent that I have provided a flexible laterally-restrained center pin which is so mounted in the cab underframe of a locomotive that it requires no additional space in the cab and does not increase the over-all height of the locomotive. The present structure makes it possible to eliminate the swing bolster from a locomotive truck and at the same time permit the lateral movement of the truck necessary for the proper operation of the locomotive. Also, the present structure permits the use of three motors on a three-axle truck without increasing the wheel base length of the truck. The desired restraining action for operation at high speeds may be obtained by the strength and initial set-up of the resilient members utilized to restrain the lateral movement of the center pins.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a locomotive, in combination, a cab underframe comprising cross ties and longitudinal members which rest upon the cross ties, each cross tie comprising spaced side members, a center pin having a rectangular portion slidably disposed between said side members and movable laterally in the underframe, oppositely disposed plates removably attached to the side members to retain the center pin in the underframe, cup means slidably disposed in the cross tie on opposite sides of the center pin, resilient means removably disposed in said cup means for restraining the lateral movement of the center pin, and cap means removably attached to the exterior of the cross tie and overlapping the cup means to retain the resilient means in the cup means.

2. In a locomotive, in combination, a cab underframe comprising cross ties and longitudinal members which rest upon the cross ties, each cross tie comprising spaced side members, a center pin having a rectangular portion slidably disposed between said side members and movable laterally in the underframe, oppositely disposed plates removably attached to the side members to retain the center pin in the underframe, cup means slidably disposed in the cross tie on opposite sides of the center pin, resilient means removably disposed in said cup means for restraining the lateral movement of the center pin, stop means on the cross tie for limiting said lateral movement, and cap means removably attached to the exterior of the cross tie and overlapping the cup means to retain the resilient means in the cup means.

3. In a locomotive, in combination, a cab underframe comprising cross ties and longitudinal members which rest upon the cross ties, each cross tie comprising spaced side members, a center pin having a rectangular portion slidably disposed between said side members and movable laterally in the underframe, oppositely disposed plates removably attached to the side members to retain the center pin in the underframe, a plurality of cups slidably disposed in the cross tie on opposite sides of the center pin, resilient means removably disposed in said cups for restraining the lateral movement of said center pin, and cap means removably attached to the exterior of the cross tie for retaining the resilient means in said cups.

4. In a locomotive, in combination, a cab having an underframe comprising a pair of cross ties and longitudinal members which rest upon the cross ties, each cross tie comprising spaced side members, a pair of trucks having motors therein for propelling the locomotive, a center pin slidably disposed between the side members of each cross tie for supporting the cab on the trucks, oppositely disposed plates removably attached to the side members to retain the center pins in the underframe, said center pins being movable laterally in said underframe, cup means slidably disposed in said cross ties, resilient means removably disposed in the cup means for restraining the lateral movement of the center pins, and cap means removably attached to the exterior of the cross ties and overlapping the cup means to retain the resilient means in the cup means.

5. In a locomotive, in combination, a cab having an underframe comprising a pair of cross ties and longitudinal members which rest upon the cross ties, each cross tie comprising spaced side members, a pair of trucks having motors therein for propelling the locomotive, a center pin slidably disposed between the side members of each cross tie for supporting the cab on the trucks, oppositely disposed plates removably attached to the side members to retain the center pins in the underframe, said center pins being movable laterally in said underframe, cup means slidably disposed in said cross ties on opposite sides of said center pins, resilient means removably disposed in the cup means for restraining the lateral movement of the center pins, and cap means removably attached to the exterior of the cross ties for retaining the resilient means in the cup means.

FRANK L. ALBEN.

REFERENCES CITED

The following references are of record in the file of this patent:

UNITED STATES PATENTS

| Number | Name | Date |
|---|---|---|
| 564,363 | Cliff | July 21, 1896 |
| 1,544,125 | Bell | June 30, 1925 |
| 2,263,442 | Maris | Nov. 18, 1941 |
| 2,271,867 | Maris | Feb. 3, 1942 |

FOREIGN PATENTS

| Number | Country | Date |
|---|---|---|
| 52,781 | Denmark | Feb. 19, 1936 |
| 417,844 | England | Oct. 12, 1934 |